United States Patent
Iordache et al.

(10) Patent No.: US 12,547,692 B2
(45) Date of Patent: *Feb. 10, 2026

(54) FACIAL RECOGNITION FRAMEWORK USING DEEP LEARNING FOR ATTENDED ROBOTS

(71) Applicant: UiPath, Inc., New York, NY (US)

(72) Inventors: Razvan-Alexandru Iordache, Bucharest (RO); Daniel-Alexandru Morie, Bucharest (RO)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,635

(22) Filed: Apr. 1, 2024

(65) Prior Publication Data

US 2024/0265081 A1    Aug. 8, 2024

Related U.S. Application Data

(63) Continuation of application No. 16/595,694, filed on Oct. 8, 2019, now Pat. No. 11,947,644.

(51) Int. Cl.
| | |
|---|---|
| *G06F 21/31* | (2013.01) |
| *G06F 9/455* | (2018.01) |
| *G06F 21/32* | (2013.01) |
| *G06V 10/764* | (2022.01) |
| *G06V 10/82* | (2022.01) |
| *G06V 40/16* | (2022.01) |

(52) U.S. Cl.
CPC .......... *G06F 21/32* (2013.01); *G06F 9/45512* (2013.01); *G06V 10/764* (2022.01); *G06V 10/82* (2022.01); *G06V 40/166* (2022.01); *G06V 40/172* (2022.01)

(58) Field of Classification Search
CPC ...................................................... G06F 21/32
See application file for complete search history.

(56) References Cited

U.S. PATENT DOCUMENTS

| | | | |
|---|---|---|---|
| 9,177,130 B2 * | 11/2015 | Nechyba | G06F 21/32 |
| 10,733,329 B1 * | 8/2020 | Ragupathy | G06F 21/78 |
| 11,017,213 B1 * | 5/2021 | Trani | G06V 40/172 |

(Continued)

FOREIGN PATENT DOCUMENTS

| | | | |
|---|---|---|---|
| CN | 109976177 A | 7/2019 | |
| WO | WO-2018022112 A1 * | 2/2018 | G06F 21/32 |

OTHER PUBLICATIONS

Enterprise-class Security for Robotic Process Automation Anywhere.

(Continued)

*Primary Examiner* — James R Turchen
(74) *Attorney, Agent, or Firm* — Volpe Koenig

(57) ABSTRACT

A facial recognition framework may be configured for robotic process automation (RPA) to automate a workflow for an application interface. A set of images of a user may be captured after the robot is initiated for the automated workflow. The set of images may be utilized by a deep learning neural network model to identify facial characteristics. The automated workflow may be performed by an attended robot based on successful validation of the user with the facial characteristics and credentials of the user for the attended robot.

18 Claims, 9 Drawing Sheets

(56) References Cited

U.S. PATENT DOCUMENTS

| | | | |
|---|---|---|---|
| 2003/0198368 A1* | 10/2003 | Kee | G06V 40/16 |
| | | | 382/117 |
| 2006/0204058 A1 | 9/2006 | Kim et al. | |
| 2013/0012226 A1* | 1/2013 | Leclercq | H04W 64/006 |
| | | | 455/456.1 |
| 2015/0273704 A1* | 10/2015 | Inaba | G06F 21/32 |
| | | | 700/264 |
| 2016/0140436 A1* | 5/2016 | Yin | G06V 30/194 |
| | | | 706/20 |
| 2017/0255198 A1 | 9/2017 | Rodriguez | |
| 2017/0295243 A1* | 10/2017 | Kim | H04L 67/146 |
| 2018/0025141 A1 | 1/2018 | Chandraker et al. | |
| 2018/0089870 A1* | 3/2018 | Billi-Duran | G06Q 10/20 |
| 2019/0034818 A1 | 1/2019 | Murakami | |
| 2019/0042718 A1 | 2/2019 | Prakash et al. | |
| 2019/0130094 A1* | 5/2019 | Votaw | G06F 21/552 |
| 2019/0147451 A1* | 5/2019 | Deutschmann | G06Q 20/02 |
| | | | 705/42 |
| 2019/0180746 A1 | 6/2019 | Diwan et al. | |
| 2019/0311184 A1* | 10/2019 | Bourlai | G06F 18/2413 |
| 2020/0005794 A1 | 1/2020 | Kim | |
| 2020/0067923 A1* | 2/2020 | Dasari | H04L 63/104 |
| 2020/0082062 A1* | 3/2020 | Mequanint | G06F 21/44 |
| 2020/0310844 A1* | 10/2020 | Dennis | H04L 63/083 |
| 2020/0311448 A1* | 10/2020 | Parupati | G06V 40/197 |
| 2021/0097261 A1* | 4/2021 | Kapinos | G06N 3/04 |

OTHER PUBLICATIONS

Schroff, F. et al., FaceNet: A Unified Embedding for Face Recognition and Clustering, V3, Jun. 2015.

Parkhi, O. M. et al., Deep Face Recognition, frameworks from the Visual Geometry Group at the University of Oxford, 2015.

* cited by examiner

FIG. 5

FACIAL RECOGNITION FRAMEWORK USING DEEP LEARNING FOR ATTENDED ROBOTS

This application is a continuation of U.S. patent application Ser. No. 16/595,694, filed Oct. 8, 2019, which is incorporated by reference as if fully set forth.

BACKGROUND

Robotic process automation (RPA) may automate repetitive operations, functions, or workflows in enterprise platforms, virtual machine (VM) configurations, remote desktops, cloud computing, desktop applications, mobile applications, or the like. Similar to other digital environments, data or security breaches with RPA may occur due to vulnerabilities such as employee carelessness, accidental leak, unawareness, viruses, or the like. Data breach risk may be particularly higher in digital environments where attended robots handle confidential data.

Security and authentication procedures may be configured to prevent data breaches. Facial or other biometric recognition based authentication may be utilized for attended robot based RPA to allow certain restricted users to manage a robot. It may be particularly desirable to use a facial recognition framework and deep learning for attended robot RPA.

SUMMARY

Methods and apparatuses for authentication using facial recognition for a standalone or additional security layer for attended robot operation may be configured or utilized. When a process of a workflow is initiated for robotic process automation (RPA), facial recognition authentication of a person, user, or operator may be performed to secure sensitive data, information, systems, or the like.

BRIEF DESCRIPTION OF THE DRAWING(S)

A more detailed understanding may be had from the following description, given by way of example in conjunction with the accompanying drawings, wherein like reference numerals in the figures indicate like elements, and wherein:

FIG. 5 is an example of purchase order creation for a facial recognition framework for RPA.

DETAILED DESCRIPTION

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
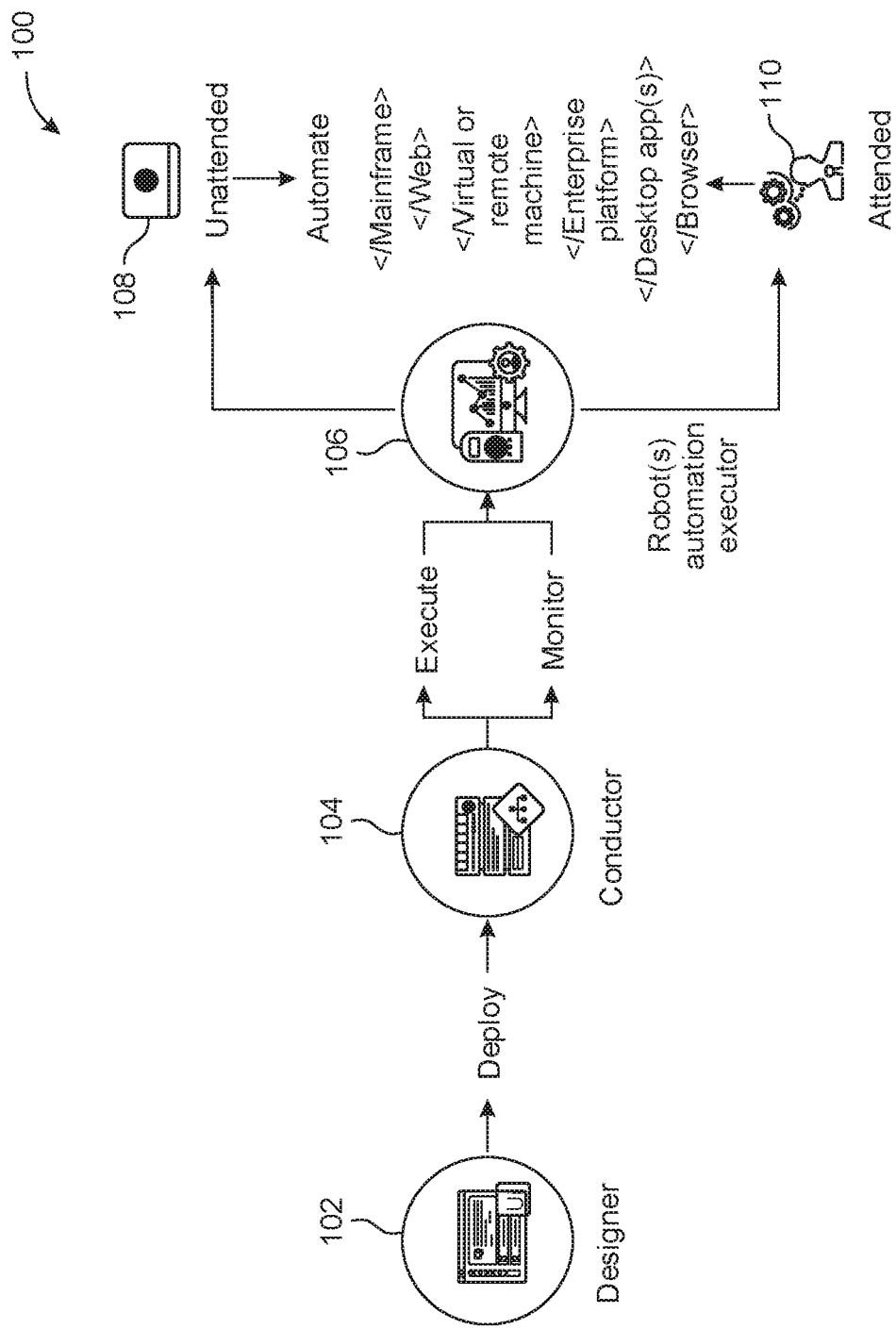
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be WIN32, Java, Flash, hypertext markup language (HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
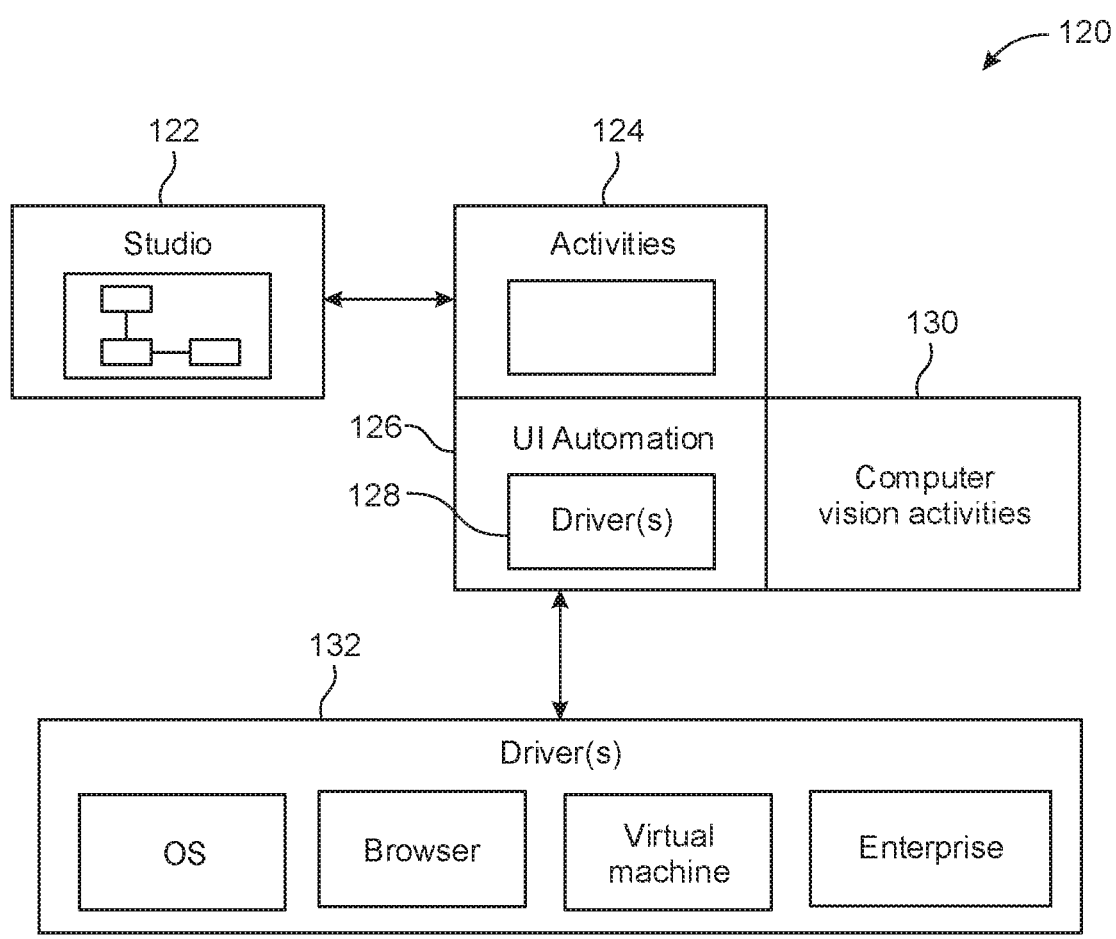
FIG. 1B is another illustration of RPA development, design, operation, or execution.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
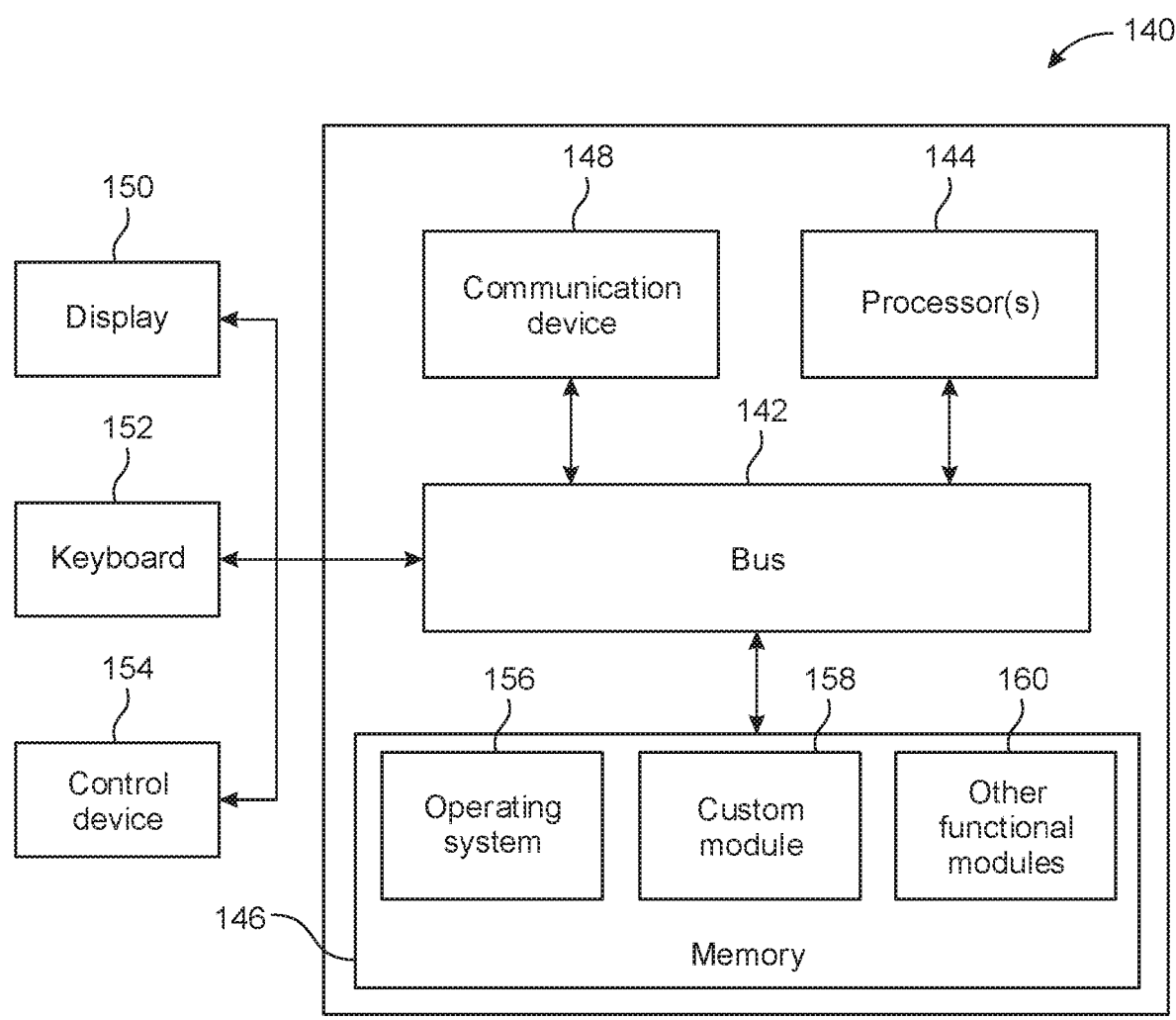
FIG. 1C is an illustration of a computing system or environment.

FIG. 1C is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Figure 2A:
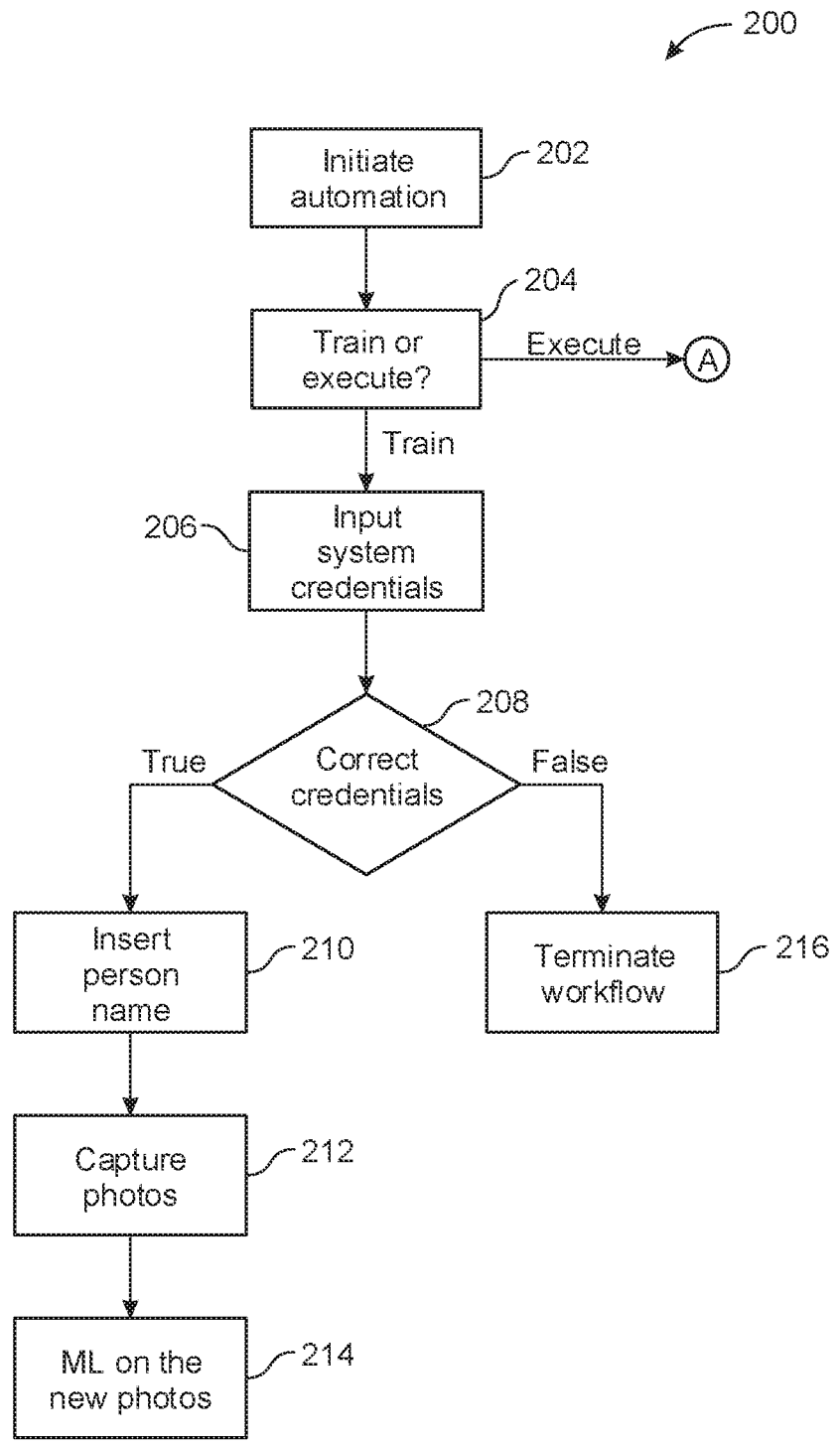
FIG. 2A is an illustration of training for a facial recognition framework for RPA of an attended robot(s)
Figure 2B:
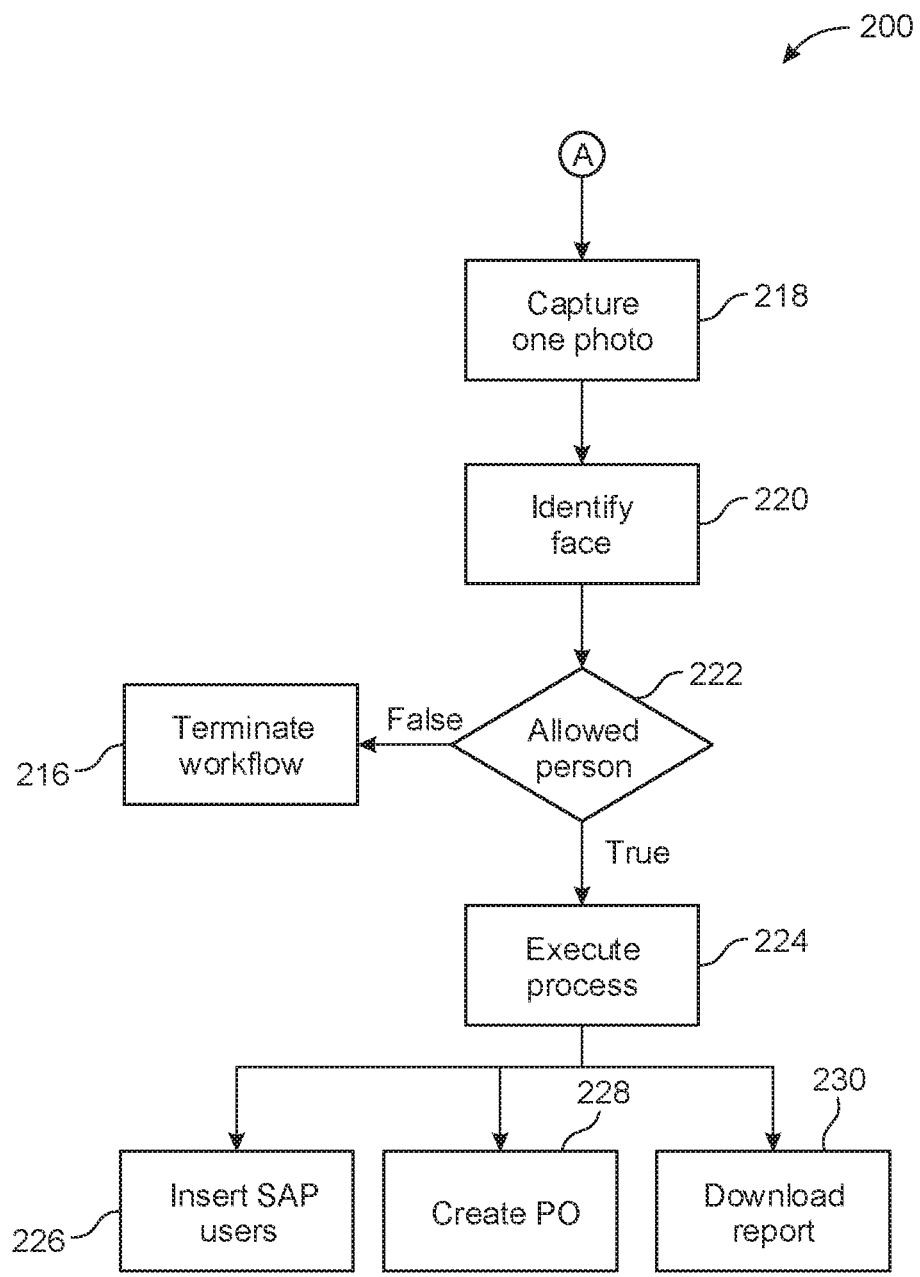
FIG. 2B is an illustration of executing a security layer for RPA of an attended robot(s) using a facial recognition framework.

FIG. 2A is an illustration of training for a facial recognition framework for RPA of an attended robot(s) 200 that may be implemented as part of a conductor, orchestrator, or the like. FIG. 2B is an illustration of executing a security layer for RPA of an attended robot(s) using a facial recognition framework. In certain configurations, the security layer may be part of a workflow or workflow activity to automate an application interface.

An automated process may be initiated (202) for an attended robot(s) running in the background, system tray, or the like. An attended robot(s) running in the background may await for a key press, such as Ctrl+Shift+R, to initiate or trigger a robot(s). The automated process may be any process related to a workflow or workflow activity. Moreover, a validation application or station may be configured to provide attended robot users with the capability to perform real time operations such as create, read, update, or delete (CRUD) documents. The capability may be for classification, human data extraction, human data validation, or the like in relation to an automation process. Other processes may include to insert SAP users, create a purchase order (PO), download a report, or the like.

After initiation, the attended robot(s) may provide train or execute phases (204) of a deep learning, deep learning neural network, TensorFlow deep learning, TensorFlow framework model, or the like for face recognition. TensorFlow may be configured or utilized via a library of a programming language. For instance, TensorFlow may be a library found in the Python programming language. The train or execute phases may provide an additional or extra security layer by performing face recognition. For a train workflow, operation, or phase, an attended robot(s) may prompt for manual input of person or user credentials (206) such as a username, password, nickname, code, key, or the like. If credentials are correct (208), the operation or phase requests the person's or user's name (210). Otherwise, the train workflow, operation, or phase is terminated (216).

The attended robot(s) may capture one or more, or a set of images or photos of a person or user (212), such as in front of a machine or device, to verify ownership. In certain configurations, one or more, or a set of images or photos may be captured by a space key press and operation closed by an escape (ESC) key press. The captured one or more, or a set of images or photos may be processed to train an existing or new machine learning (ML) model (214). For instance, the ML model may be better trained for an existing person or user or may learn facial characteristics of a new person or user. The model may identify faces and learn the features to create biometric information of the person or user. The biometric information may be associated with the username for future recognition.

For an execute workflow, operation, or phase, after selection by manual input of "EXECUTE", one or more automated processes for RPA may be initiated. An attended robot(s) may capture one or more photos or images of a person or user (218), such as in front of the machine, to verify ownership. The model may perform the identification (220) of the person or user according to known faces and reply with success or fail for an allowed person (222). If the person or user is disallowed, the EXECUTE workflow, operation, or phase may be terminated (216). On successful validation, execution of the automated process (224) for RPA to the person or user may be allowed or proceed. In certain configurations, workflow execution and processing by an unattended robot(s) may be triggered by Ctrl+Shift+R or the like key sequence. Furthermore, examples of workflow execution may insert SAP users (226), a process to create a PO (228), a process to download a report (230), or the like.

For examples given herein, in certain configurations facial recognition may be performed based on a deep learning neural network, ML software libraries, a TensorFlow framework, or the like. Facial recognition models may utilize one or more of those provided in a "FaceNet: A Unified Embedding for Face Recognition and Clustering" by Schroff et al. v3 published Jun. 17, 2015, "Deep Face Recognition" by Parkhi et al., frameworks from the Visual Geometry Group at the University of Oxford, or the like that are all herein incorporated by reference as if fully set forth.

For examples given herein, in certain configurations, a facial recognition model may be configured to identify or recognize faces from real time videos. A facial recognition model may also be configured to identify or recognize a plurality of faces simultaneously from one or more photos, images, videos, or the like. If the facial recognition model is configured to recognize a plurality of faces simultaneously, the robot configured for facial validation may reject the validation and terminate a process if any one or more of the faces is not recognized as belonging to an authorized person.

A facial recognition model may also utilize information from other sources such as registration for an event, professional details on online platforms, or the like to identify if the person or user recognized has the authority to initiate an automated process for RPA. For example, in events where people who have not registered are also present, one or more high-resolution cameras may be configured to capture a photo, image, video, or the like. The model may then search the user's profile to analyze details on employment status at the company, employment with a competitor, a valid registration for the event, or the like. Upon satisfying such criteria, the person or user is recognized as a valid person or user.

In certain configurations, an unattended robot may also be configured to monitor one or more real-time, high-resolution cameras of a venue, during a private entrance event for example, and recognize any unauthorized persons for security. A process may be triggered based on the real-time monitoring to notify security of the unauthorized person. In addition, during an event that requires attendee registration, a high-resolution camera may be placed facing the persons at a registration area or space. An unattended robot may also automatically trigger a process to recognize if the person is registered to the event in relation to the registration area or space.

For examples given herein, in certain configurations facial recognition may be based on training or pre-training one or more of eye position, eye brows, photos of faces of one or more different angles, images of faces of one or more different angles, or the like. In certain configurations, a facial recognition framework may be configured using a software connector component or module for RPA. A software connector, such as a Python connector, may be an architectural building block, component, or module to effect, regulate, or the like interactions among or between components.

Referring again to training or re-training, a facial recognition model may output a score from 0 to less than 1 confidence for a person or user. A group of people may be similarly trained by the facial recognition model. The facial recognition model may be configured locally, remotely, in the cloud, or the like.

Figure 3:
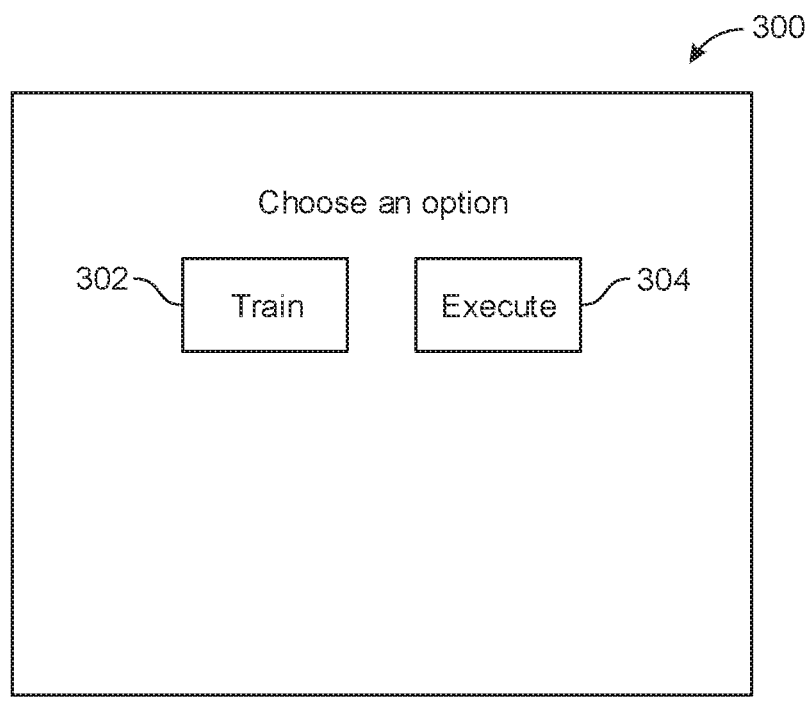
FIG. 3 is an example of a validation application for mobile or enterprise RPA.

FIG. 3 is an example of a validation application for mobile or enterprise RPA 300. Prior to operation of one or more processes to be performed by one or more robots, a validation, verification, or security application may launch with the option to train (302) or execute (304) a recognition model or framework. The validation, verification, or security application may be part of a workflow controlled by a conductor, orchestrator, or the like of one or more robots for automation, RPA, or the like. One or more robots may include both attended and unattended robots or at least one attended robot. In certain configurations, facial, biometric, or the like validation may only be performed through an attended robot. Validation or security may be launched prior to a process by an attended robot that may be associated with one or more attended or unattended robots before, after, or currently running workflows or processes.

The facial recognition framework given herein may be utilized to scrape a data registration database. This may be performed by a RPA robot(s) in the background after a photo or image of a user is taken to recognize, identity, and then automatically scrape the data of the registration database. Moreover, an attended robot(s) may launch a re-verification or identification process if an amount for payment by RPA is above a threshold in relation to a transaction. The attended robot(s) may process a transaction upon successful re-verification or identification.

Figure 4:
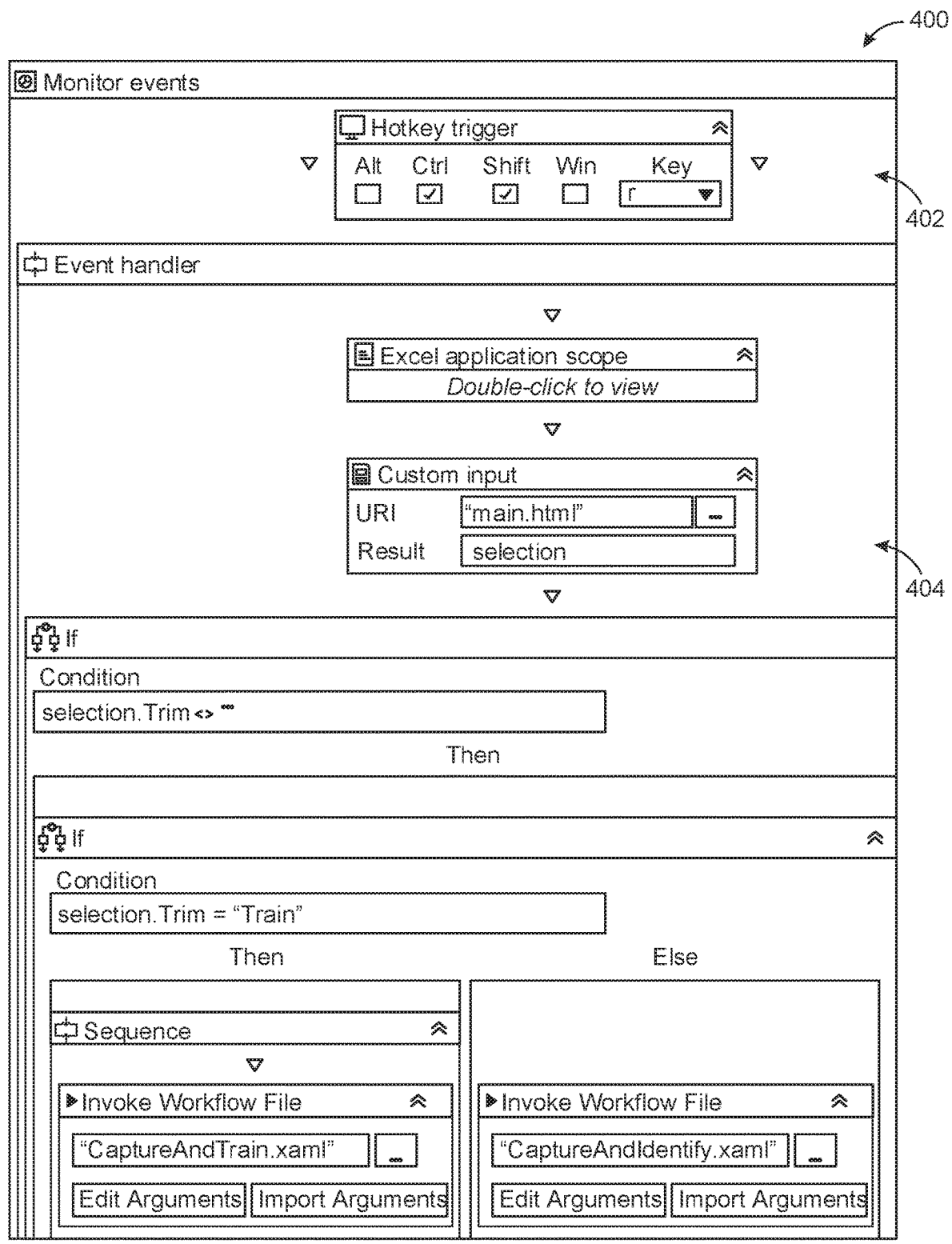
FIG. 4 is an example of monitoring a system for events to trigger a facial recognition framework for RPA.

FIG. 4 is an example of monitoring a system for events to trigger a facial recognition framework for RPA 400. A monitor events component 402 may run in relation to an attended robot(s) to wait for a key press, such as Ctrl+Shift+R, to initiate or trigger a workflow for RPA. An event handler 404 may execute once a trigger or key press(es) are detected. In addition, further conditional processes and sequences may be executed in relation to monitoring the system for events to trigger the facial recognition framework for RPA 400 as explained herein. In monitoring a system for events to trigger a facial recognition framework for RPA 400, if Train is selected a Workflow for "CaptureAndTrain" may be performed. Otherwise, a Workflow to "CaptureAndIdentify" may be performed.

Figure 5:
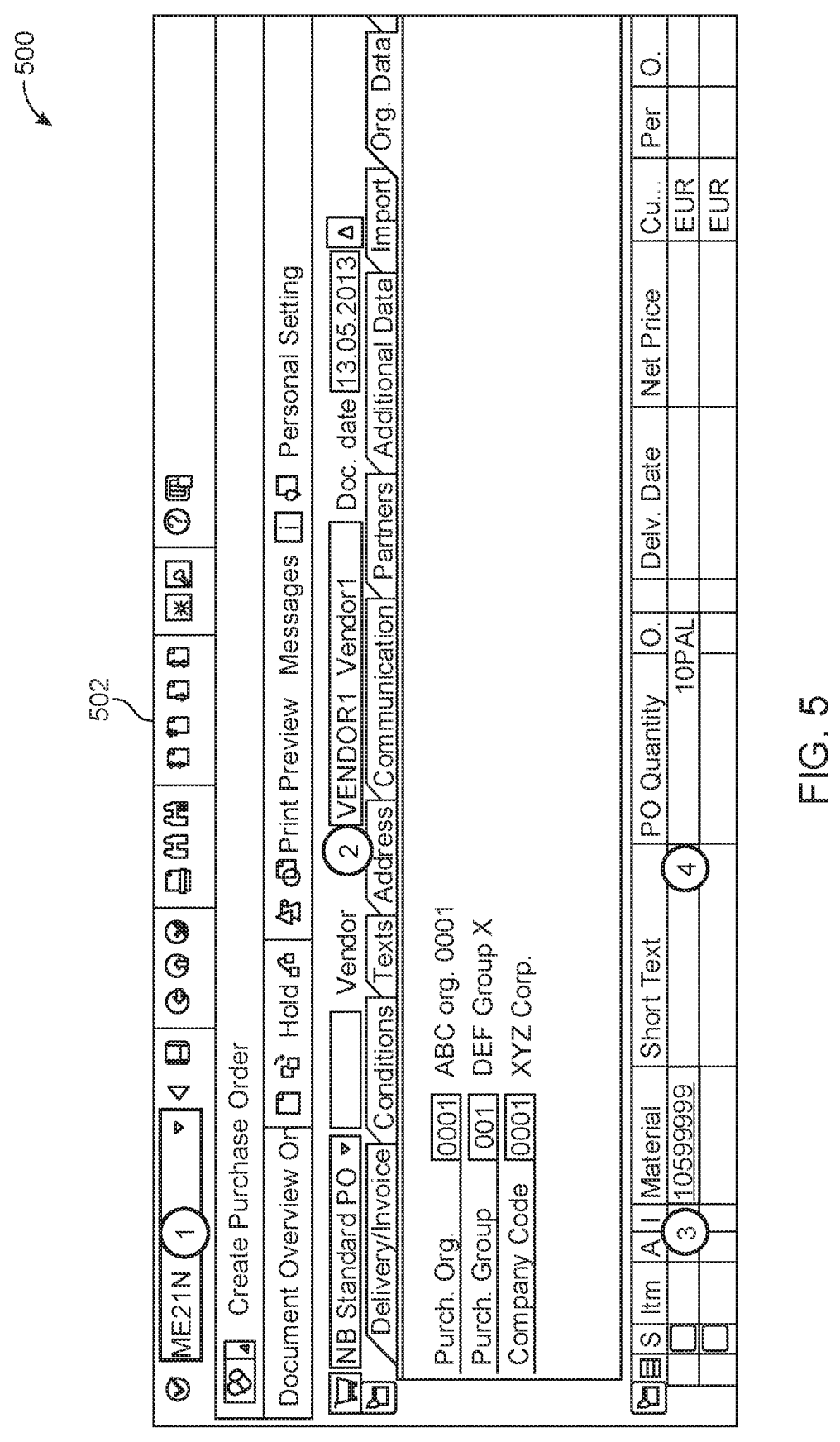

FIG. 5 is an example of PO creation for a facial recognition framework for RPA 500. A PO 502 may include code ME21N (1) to trigger a PO creation window or application. PO 502 may also include vendor field (2) with value VENDOR1, a Material field (3) 10599999, and PO Quantity 10 (4). Based on or after a successful verification of an allowed person in relation to a facial recognition framework, an insert SAP users operation may receive an input having transactions from a conductor, orchestrator, or the like. The transactions may come from the queue of a conductor, orchestrator, or the like in relation to another RPA workflow. A robot may poll one or more queue(s) of a conductor or orchestrator, reading the transactions, and execute a corresponding process. A robot may also populate one or more queues of a conductor, orchestrator, with new or updated transactions.

Each transaction may be complete such that it comprises all the information that needs to be filled or populated by the attended robot(s) in SAP. The attended robot(s) may retrieve and decrypt data from a conductor, orchestrator, or the like by a "Get Queue Item" or the like activity. A password suggested by another system or workflow may be encrypted and decrypted by the attended robot(s) prior to entry to SAP. The robot(s) may subsequently open SAP and start to populate the required fields in order to create a new account for each new employee with a username, address, logon data, or the like.

In relation to a SAP LogOn, an attended robot(s) may open a SAP LogOn application, choose the appropriate server with a "Click" activity, and then insert the username and password. The attended robot(s) may retrieve credentials, such as in relation to the facial recognition RPA framework, through a hypertext transfer protocol secure (HTTPs) tunnel from a conductor, orchestrator, or the like component. An attended robot(s) may encounter messages such as "Another user is logged in with this user", "Your license is about to expire in x days", or the like requiring attention.

As previously given, PO code ME21N may be a transaction for PO creation. An activity may be utilized by an attended robot(s) for reading an input as part of an App Integration package. With the vendor master data, a PO may be filled with information from the purchase information record and material master by an attended robot(s).

Referring again to FIG. 5, (2) may be populated by an attended robot(s) from the record of purchase information scraped from a screenshot or image. Item (3) may be populated from the master of the vendor. A PO number may be copied by an attended robot(s) from SAP and inserted with the matching input row.

Once the user is created successfully, the transaction may be updated in a conductor, orchestrator, or the like queue. A transaction status may include a Successful, Application Exception if any application during the process crashed, Business Exception, or the like. A failure or exception may occur when the user file or record is already created or any other exception considered during RPA workflow automation development. An attended robot(s) may also check if there are any new transactions for processing. If there are no more transactions, the attended robot(s) may close the SAP application and wait to be triggered by a user for new tasks.

In addition, based on or after a successful verification of an allowed person in relation to a facial recognition framework, a second process may create a PO as "ME21N" as part of an operation. In connection, the attended robot(s) may open a SAP application and create one or more POs for requested items. Also, based on or after a successful verification of an allowed person in relation to a facial recognition framework, a third process may download a report as "FBL1N" as part of an operation. As part of the download, vendor line items may be searched. An attended robot(s) may enter a Vendor account and the company code in order to fetch the data from a table such as a Vendor Master Data table. The attended robot(s) may subsequently logout and close the SAP application.

An attended robot(s), in relation to a facial recognition framework of RPA, may navigate a SAP platform. Part of the navigation may include gathering data and returning another file, such as Microsoft Excel. As part of the process, a digital assistant may ask if the report should be emailed and to whom.

Figure 6:
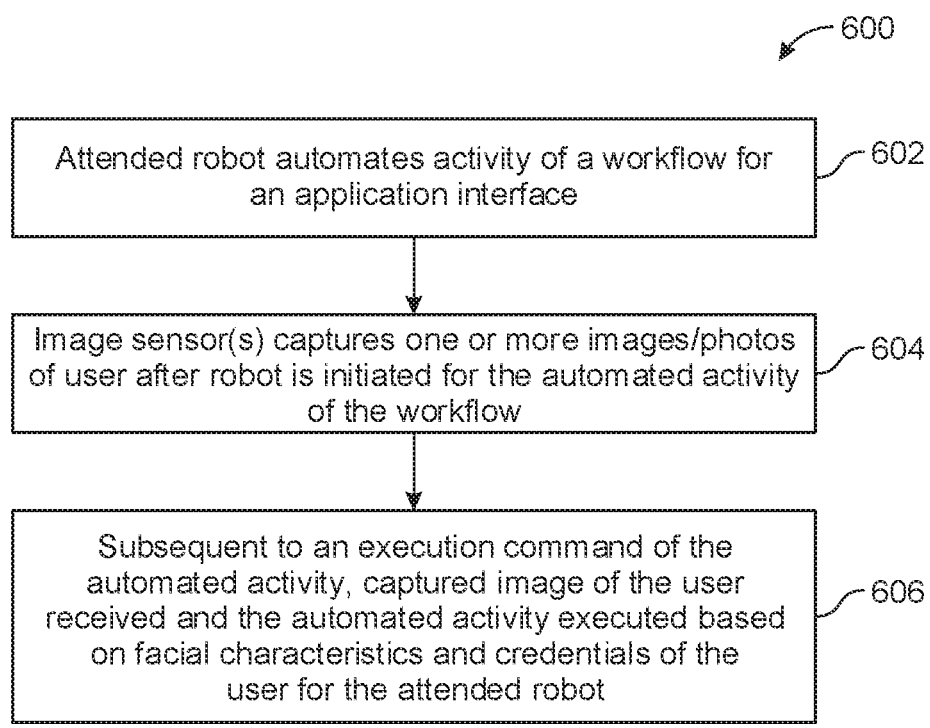
FIG. 6 is a process of a facial recognition framework for RPA.

FIG. 6 is a process of a facial recognition framework for RPA 600. An attended robot(s) may automate an activity of a workflow for an application interface (602). An image sensor(s) may capture one or more or a set of images or photos of a user after the robot(s) is initiated for the automated activity of the workflow (604). Subsequent to an execution command of the automated activity, a captured image of the user may be received and the automated activity executed (606). The execution of the automated activity may be performed based on one or more of successful validation of the user with the facial characteristics, the biometric information of the user, or credentials of the user for the attended robot(s).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
a processor configured to operate an attended software robotic automation executor to automate a workflow for an application interface; and
an image sensor configured to capture, after the attended software robotic automation executor is initiated, a set of images configured used to identify facial characteristics of a user via a deep-learning neural network model;
the processor is configured to receive an execution command of the automation of the workflow by the attended software robotic automation executor on a condition that a captured image of the user is successfully validated based on the identified facial characteristics by achieving a confidence level via an assigned confidence score output by the neural network model, and
the processor terminating the workflow on a condition that the captured image configures an unsuccessful validation.

2. The computing device of claim 1, wherein the successfully validated based on the identified facial characteristics is related to a security layer.

3. The computing device of claim 2, wherein the security layer is part of the automation of the workflow for the application interface.

4. The computing device of claim 1, wherein the set of images are utilized in a framework to update the deep-learning neural network model.

5. The computing device of claim 1, wherein the set of images are utilized in a framework to create facial biometric information of the user.

6. The computing device of claim 1, wherein the set of images are utilized in a framework to update facial biometric information of the user.

7. A method performed by a computing device, the method comprising:
operating, by the computing device, an attended software robotic automation executor configured to automate a workflow for an application interface;

capturing, by the computing device after the attended software robotic automation executor is initiated, a set of images of a user used to identify facial characteristics of the user via a deep-learning neural network model;

receiving, by the computing device, an execution command of the automation of the workflow by the attended software robotic automation executor; and processing, by the computing device, on a condition that a captured image of the user is successfully validated based on the identified facial characteristics by achieving a confidence level via an assigned confidence score output by the neural network model, and terminating, by the computing device, the workflow on a condition that the captured image of the user configures an unsuccessful validation.

8. The method of claim 7, wherein the successfully validated based on the identified facial characteristics is related to a security layer.

9. The method of claim 8, wherein the security layer is part of the automation of the workflow for the application interface.

10. The method of claim 7, wherein the set of images are utilized in a framework to update the deep-learning neural network model.

11. The method of claim 7, wherein the set of images are utilized in a framework to create facial biometric information of the user.

12. The method of claim 7, wherein the set of images are utilized in a framework to update facial biometric information of the user.

13. A non-transitory computer readable medium including code stored thereon which when executed by a processor cause the system to be performed by a computing device, the method comprising:

operating, by the computing device, an attended software robotic automation executor configured to automate a workflow for an application interface;

capturing, by the computing device after the attended software robotic automation executor is initiated, a set of images of a user used to identify facial characteristics of the user via a deep-learning neural network model;

receiving, by the computing device, an execution command of the automation of the workflow by the attended software robotic automation executor; and processing, by the computing device, on a condition that a captured image of the user is successfully validated based on the identified facial characteristics by achieving a confidence level via an assigned confidence score output by the neural network model, and terminating, by the computing device, the workflow on a condition that the captured image of the user configures an unsuccessful validation.

14. The non-transitory computer readable medium of claim 13, wherein the successfully validated based on the identified facial characteristics is related to a security layer.

15. The non-transitory computer readable medium of claim 14, wherein the security layer is part of the automation of the workflow for the application interface.

16. The non-transitory computer readable medium of claim 13, wherein the image is utilized in a framework to update the deep-learning neural network model.

17. The non-transitory computer readable medium of claim 13, wherein the image is utilized in a framework to create facial biometric information of the user.

18. The non-transitory computer readable medium of claim 13, wherein the image is utilized in a framework to update facial biometric information of the user.

\* \* \* \* \*